US007249404B2

(12) United States Patent
Hauch

(10) Patent No.: US 7,249,404 B2
(45) Date of Patent: Jul. 31, 2007

(54) HAMMERMILL WITH STUB SHAFT ROTOR APPARATUS AND METHOD

(75) Inventor: David Hauch, Afton, MN (US)

(73) Assignee: Carter Day International, Inc., Minneapolis, MN (US)

( * ) Notice: Subject to any disclaimer, the term of this patent is extended or adjusted under 35 U.S.C. 154(b) by 3 days.

(21) Appl. No.: 11/325,711

(22) Filed: Jan. 5, 2006

(65) Prior Publication Data

US 2006/0107515 A1 May 25, 2006

Related U.S. Application Data

(62) Division of application No. 10/442,494, filed on May 20, 2003, now Pat. No. 7,025,294.

(51) Int. Cl.
*B23P 17/00* (2006.01)

(52) U.S. Cl. .................................... 29/452; 29/525.02

(58) Field of Classification Search ................ 241/194; 29/452, 525.02

See application file for complete search history.

(56) References Cited

U.S. PATENT DOCUMENTS 3,779,470 A 12/1973 Smits
4,925,114 A 5/1990 Ostegaard
5,188,303 A 2/1993 Hoof

*Primary Examiner*—Mark Rosenbaum
(74) *Attorney, Agent, or Firm*—Fredrikson & Byron, P.A.

(57) ABSTRACT

An improved rotor design for hammermills. The invention eliminates the solid rotor shaft and replaces it with a tubular structure comprised of two stub rotor shafts with plate flanges and grooved spacer rings therebetween. End head disks, attached to the plate flanges, and intermediate disks are concentrically positioned with the axis of rotation of the assembly. The intermediate disks are held in alignment by the pilot groove located in the spacer rings. The flanges, stub shafts, spacer rings and intermediate disks are supported and held in proper alignment by tension rod compression. The resulting tubular rotor shaft assembly is less massive, more stiff, less susceptible to vibration, has a reduced bending stress, is less expensive to startup and operate and less expensive and more flexible in terms of component inventory than known solid through-shaft rotors.

4 Claims, 3 Drawing Sheets

HAMMERMILL WITH STUB SHAFT ROTOR APPARATUS AND METHOD

This application is a divisional of U.S. patent application Ser. No. 10/442,494, titled Hammermill With Stub Shaft Rotor Apparatus and Method, filed May 20, 2003, now U.S. Pat. No. 7,025,294, the content of which is hereby incorporated by reference.

FIELD OF THE INVENTION

This invention relates generally to hammermills.

BACKGROUND OF THE PRESENT INVENTION

Hammermills have long been used for grinding or comminution of materials. Typically hammermills consist of a rotor mounted on a solid through rotor shaft inside a housing. A material inlet is generally located at the top of the housing with one or more material outlets located near the bottom of the housing. The rotor includes a solid through drive shaft and rows of hammers which are normally flat steel blades or bars. A steel rod or pin pivotably connects the hammer to the rotor. The rotor is mounted inside a typically teardrop shaped enclosure, commonly known as a grinding or working chamber, which is comprised of a cutting plate mounted on either side of the material inlet for reversible hammermills. Reversible hammermills are capable of rotation in either direction, a feature which provides for increased life for the hammers, cutting plates and screen plates. The known cutting plates are comprised of a upper linear section connected with a convex radiused section and do not allow particles to escape.

Downstream of the cutting plate, the interior of the working chamber is defined by curved screen plates. The screen opening diameter is selected to match the desired particle size. Generally, material at or below an intended size limit exit the chamber through the screens while material above the size limit continue to be reduced by the rotating hammers.

Current hammermill rotor designs consist of a solid through rotor shaft which supports a number of cylindrical head disks. The head disks are keyed to the shaft and are spaced along the shaft with ring type spacers, often squeeze collars or the equivalent are employed. The head disks and spacers are held together on the rotor shaft by using bearing locknuts which are positioned on the threaded ends of the rotor shaft. These nuts are then tightened to take the clearance out between the disks and the spacers.

The disks structurally support a number of hammer pins radially around the solid rotor shaft. The swinging hammers are mounted on the hammer pins. The disks structurally support the hammer pins from the centrifugal forces generated by the rotation of the rotor which typically rotates over a range of 1500 to 3600 rpm. The disks also transmit the torque from the rotor shaft to the hammer pins; required to power the hammers through their impact against the product being processed in the hammermill.

In operation, the material to be reduced is fed into the material inlet and is directed toward the rotating hammers. The material is initially impacted by the hammers, which may cause some material reduction. The material is then flung from the hammer face against the cutting plates resulting in a primary reduction of material. After the material impacts the cutting plate, from which there is typically no outlet, the material is either flung back toward the rotating hammers or continues downstream between the hammer tip and the cutting plate until the screen plates are reached.

Ultimately, the particles encounter the openings of the screen plates. Here, the particles that are small enough begin to exit through the screen openings. The remaining particles impact the leading edge of the screen openings and are deflected up into the hammers' path. The rotating hammers continue to pulverize the material downstream of the cutting plate, moving it along the surface of the screens which define the circumference of the working chamber, causing gradual diminution of the material. Ultimately, the material is ground finely enough to permit it to flow out through the screens.

While the solid rotor shaft hammermill design as described above has been generally accepted and is widely used, there is a constant need and desire to increase the efficiency of the devices. Increasing efficiency will allow operation of the hammermill with decreased power consumption while increasing the capacity of the machine.

The present invention accomplishes these goals.

SUMMARY OF THE INVENTION

An improved rotor design for hammermills. The invention eliminates the solid rotor shaft and replaces it with a tubular structure comprised of two stub rotor shafts with plate flanges and grooved spacer rings therebetween. End head disks, attached to the plate flanges, and intermediate disks are concentrically positioned with the axis of rotation of the assembly. The intermediate disks are held in alignment by the pilot groove located in the spacer rings. The flanges, stub shafts, spacer rings and intermediate disks are supported and held in proper alignment by tension rod compression. The resulting tubular rotor shaft assembly is less massive, more stiff, less susceptible to vibration, has a reduced bending stress, is less expensive to startup and operate and less expensive and more flexible in terms of component inventory than known solid through-shaft rotors.

An object and advantage of the invention is to provide a hammermill with a more efficient structural design by eliminating the solid rotor shaft.

Another object and advantage of the invention is to provide a hammermill with a reduced maximum bending stress in the rotor shaft.

Another object and advantage of the invention is to provide a hammermill with an increased stiffness in the rotor shaft.

Another object and advantage of the invention is to provide a hammermill that is less sensitive to vibration.

Yet another object and advantage of the invention is to provide a hammermill that is less massive with a lighter inertial load than current hammermills, making start-up and reversal of rotational direction easier and less expensive.

Another object and advantage of the invention is to provide an improved method of manufacturing whereby common components may be combined to reduce the variety of parts required, resulting in reduced inventory carrying costs and improved economies of scale in the manufacturing process.

The foregoing objects and advantages of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

Figure 1:
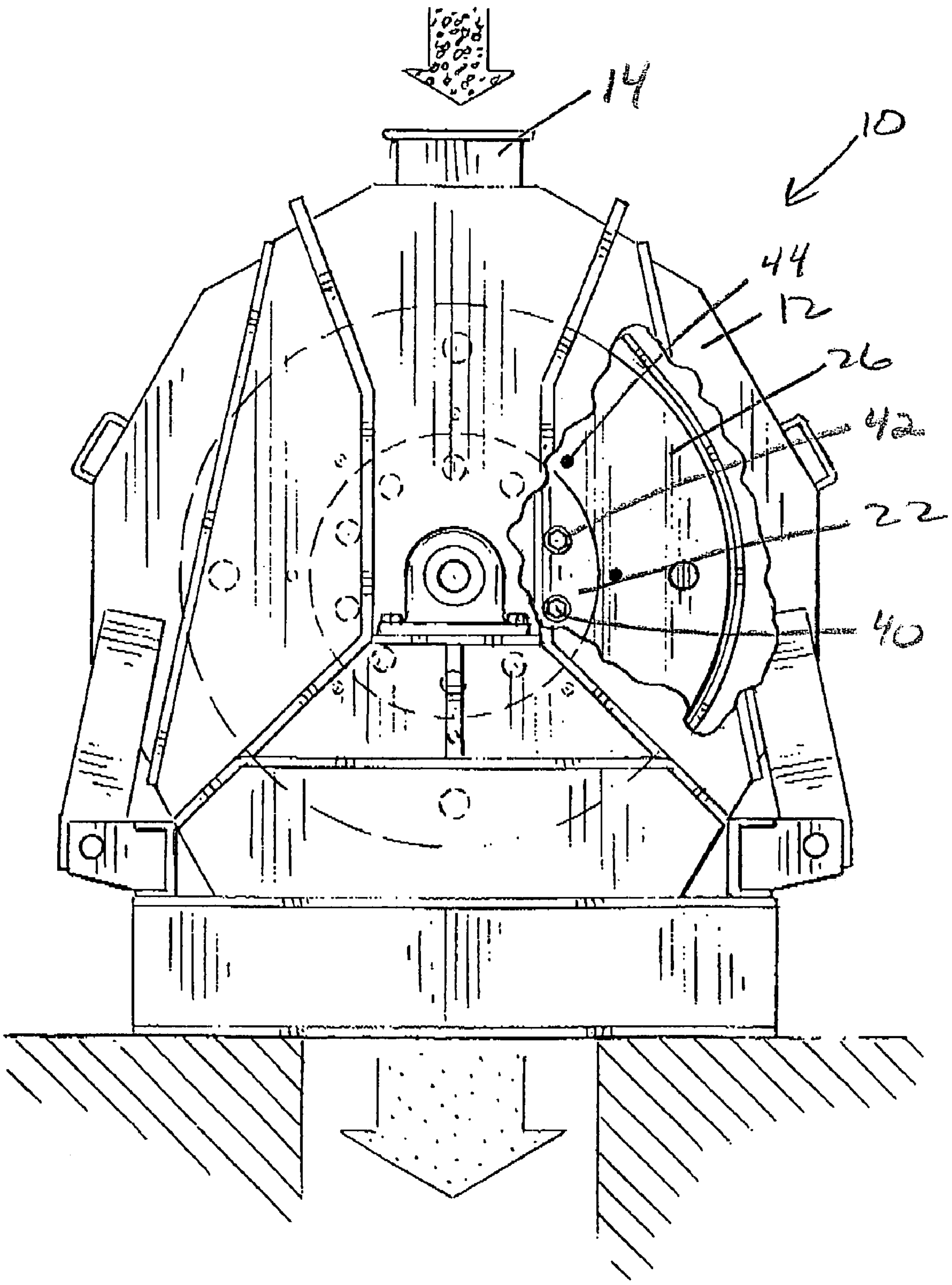
FIG. 1 is a broken away view of a hammermill.
Figure 2:
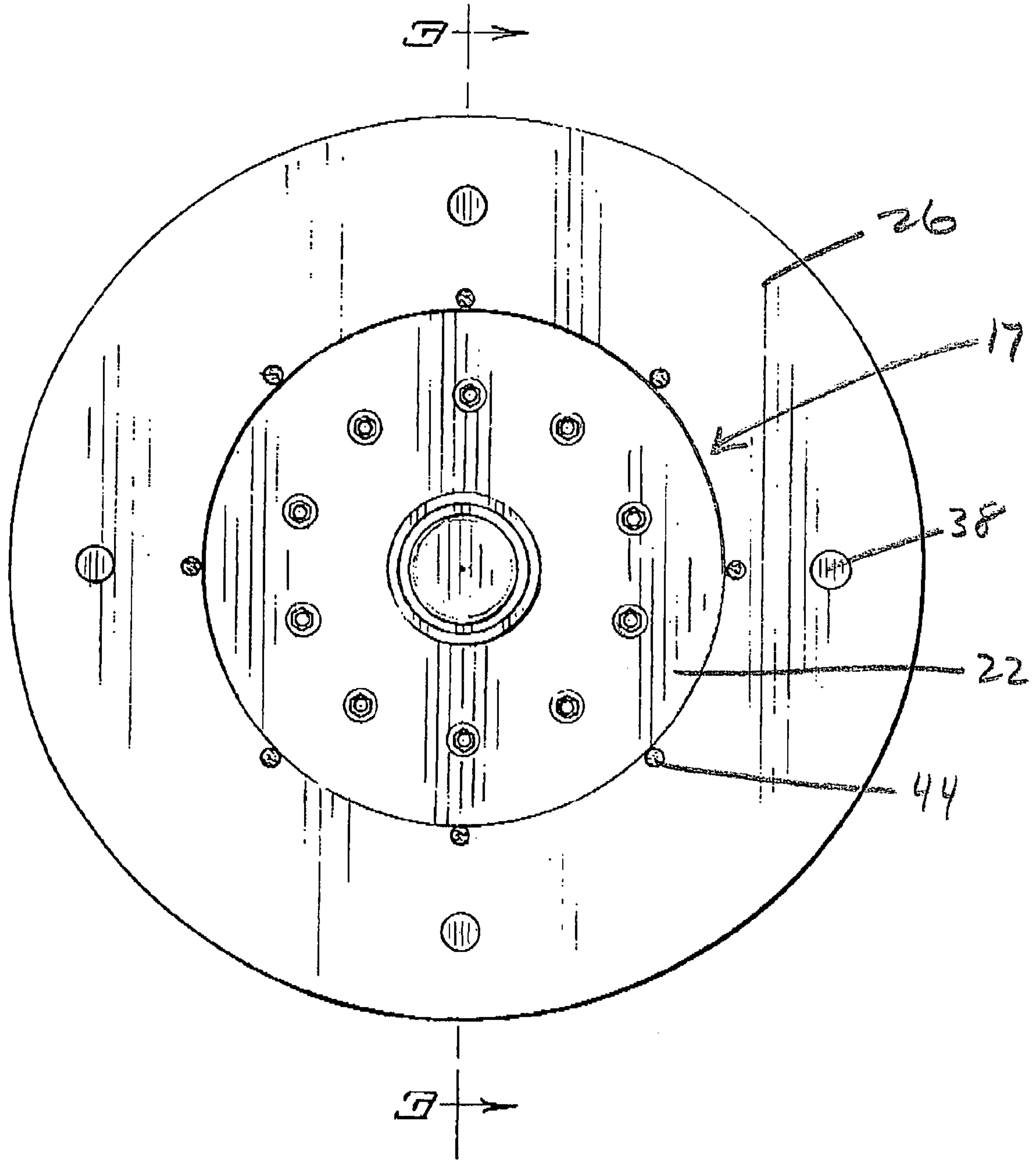
FIG. 2 is a side view of the rotor assembly.

With reference to the accompanying Figures, which provide one embodiment of the invention, there is provided a hammermill (10) for comminuting material, having a housing (12), material inlet (14), and particle discharge (16). FIG. 2 shows the rotor shaft assembly (17). The inventive tubular rotor shaft assembly (17) has an axis of rotation and comprises a driven stub rotor shaft (18), a support stub rotor shaft (20), a first flange plate (22) and a second flange plate (24), spacer rings (32), tie rods (40) and tie rod nuts (42).

Figure 3:
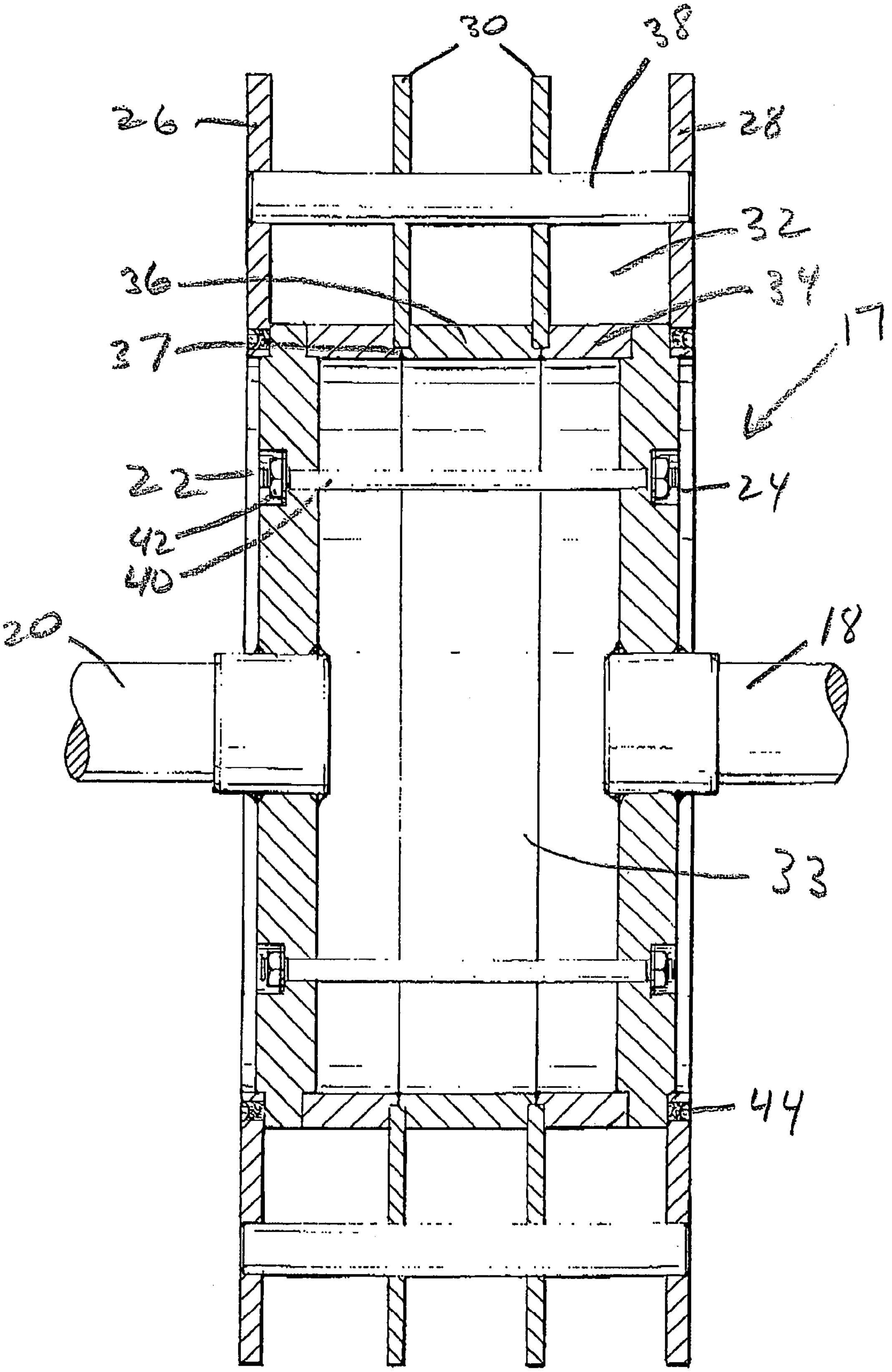
FIG. 3 is a cross sectional view of the rotor assembly.

Turning specifically to FIG. 3, the invention comprises a driven rotor stub shaft (18) that is drivingly connected to an engine or known other means for rotating the shaft, and a support rotor stub shaft (20) that is mounted to a bearing or similar structure that is not shown in the Figures. A first flange plate (22) is rigidly attached to the support rotor stub shaft (20) and a second flange plate (24) is attached to the driven rotor stub shaft (18). The two flange plates are arranged concentric with the axis of rotation of the rotor shaft assembly (17).

The Figures provide a first head disk (26) that is fixedly attached to the first flange plate (22). A second head disk (28) is fixedly attached to the second flange plate (24). Both the first and second head disks are disposed concentric with the axis of rotation of the rotor shaft assembly (17). The preferred method of attaching the flange plates (22, 24) to the head disks (26, 28) is by plug welds (44), though other equivalent attachment methods will readily present themselves to those skilled in the art.

Again with reference specifically to FIG. 3, spacer rings (32) are disposed between the first flange plate (22) and the second flange plate (24) and concentric with the axis of rotation of the rotor shaft assembly (17). When assembled, the spacer rings (32) create a tubular space within the rotor shaft assembly (17). The spacer rings (32) are also disposed concentrically around the axis of rotation of the rotor shaft (17). The two end spacer rings (34) are fixedly attached to the first flange plate (22) and the second flange plate (24), respectively. Center spacer rings (36) are arranged between, and adjacent to, the two end spacer rings (34). One or more center spacer rings (36) may be used depending on the size requirements of the hammermill. If more than one center spacer ring (36) is required, the additional spacer ring (36) will be arranged adjacent the first center spacer ring. The conjunction between the end spacer rings (34) and the center spacer (36) ring adjacent the end spacer ring (34) is notched or keyed with a pilot groove (37). Each end spacer ring (34) is circumferentially notched on one edge while the center spacer rings (36) are circumferentially notched on both edges to form the pilot groove (37) when the rings are assembled. If more than one center spacer ring (36) is used, the conjunction between the two center spacer rings is also circumferentially notched or keyed with a pilot groove (37). Thus, a pilot groove (37) extends circumferentially around each conjunction of the spacer rings (32).

Intermediate disks (30) are disposed concentric with the axis of rotation of the rotor shaft assembly (17) and between the first head disk (26) and the second head disk (28). The intermediate disks (30) are disposed along the pilot groove (37) to ensure that the intermediate disks are aligned substantially parallel with the head disks and concentric with the axis of rotation of the rotor shaft (17). Hammer pins (38) are disposed through the first head disk (26), intermediate disks (30) and second head disk (28). The spacer rings (32) maintain the alignment and spacing of the intermediate disks (30) relative to each other as well as to the head disks (26, 28).

Tie rods (40) connect the first flange plate (22) with the second flange plate (24). The tie rods (40) are secured by nuts (42) that can increase or decrease the tension by tightening or loosening the nuts (42). Increasing the tension on the tie rods provides sufficient compression to hold the entire rotor shaft assembly (17) in proper alignment and the components properly spaced relative to each other during operation. The number and combined preload compression of the tie rods is determined by the particular requirements of the rotor assembly (17). Generally, the minimum compression preload that must be applied by the tie rods (40) is the highest unit compression force at the interface joint between the spacer rings (32) and the intermediate disks (30) based on one of the two following conditions:

(1) The unit compression loading between the interface of the spacer rings (32) and the intermediate disks (30) must be equal to or greater than the maximum unit bending stress, including allowance for safety factors to be anticipated under operating conditions;

(2) The unit compression loading between the interface of the spacer rings (32) to the intermediate disks (30) in conjunction with the coefficient of friction at that interface must provide a torsional resistance force greater than the torque being transmitted by the driven rotor stub shaft (18).

A tubular cross-section is more structurally efficient than is a solid round rotor shaft. Thus, in addition to providing the functional spacing and alignment of the intermediate disks (30), the spacer rings (32) in the present invention also provide increased structural bending support to the rotor and torsional power transmission to the intermediate disks (30).

By way of example, if the cross sectional area of the spacer rings (32) in the present invention is equal to that of the known solid rotor shaft design, and if the outside diameter of the spacer ring is twice the known solid rotor shaft diameter, it can be shown mathematically that the section modulus "Z" of the spacer ring (32) will be 3.5 times that of the known solid shaft and that the moment of inertia "I" will be 7 times that of the solid shaft. In other words, using the exemplary parameters, the inventive rotor shaft may reduce the maximum bending stress in the rotor shaft assembly (17) by a factor of 7/2 and increase the stiffness of the rotor shaft assembly (17) by a factor of 7 when compared with the known solid rotor shaft. The outside diameter of the inventive tubular rotor shaft assembly (17) in multiples of the known solid shaft diameter greater than one may be used to suit the particular physical parameters and constraints of the hammermill design or to optimize the balance between structural stiffness and the mass of the rotor assembly (17). Further, because the inventive rotor shaft assembly (17) is stiffer than the known solid through-shaft, the tubular rotor shaft assembly (17) is less sensitive to vibration. The decreased sensitivity to vibration allows for more efficient operation, less potential for breakdown of the moving parts, and operation at rotational speeds that are higher than the known rotor shafts.

The known solid through-shaft is necessarily relatively massive. The inventive tubular rotor shaft assembly (17) may provide a reduction in rotor assembly weight, and thus in the overall hammermill weight, of approximately 15 to 20%. This reduction in mass results in a more efficient start-up procedure that consumes less energy to reach the desired rotational speed. In addition, the reversal of the hammermill's rotational direction will be accomplished more efficiently, more quickly, consume less energy and be less expensive as compared with the known solid shaft rotor shafts.

The inventive tubular rotor shaft assembly (17) also allows for a more efficient method of manufacturing parts for hammermills. Current hammermill solid through-shaft rotors of a given diameter are typically made in number of incremental lengths to meet processing capacity requirements. It is readily seen that the inventive tubular rotor assembly (17) width is adjusted simply by adding additional center spacer rings (36) as required by the parameters of the individual hammermill design. The center spacer rings (36) are interchangeable for hammermills with the same diameter specifications. In addition, the driven rotor stub shaft (18), the support rotor stub shaft (20), head disks (26, 28) and intermediate disks (30) are all interchangeable for hammermills with the same diameter parameters. This interchangeability of components has the benefit of reducing the variety of different components that must be inventoried to support a product line.

Thus, the present invention allows for an improved economy of scale in the manufacturing process of the common interchangeable components and reduced inventory carrying costs. Instead of manufacturing and inventorying varied lengths of the known solid through-shaft, the invention allows for manufacture and inventorying one size component for a hammermill of given diameter. The hammermill length is modified by simply adding or removing as appropriate center spacer rings (36) and intermediate disks (36). The result is a more efficient and cost-effective manufacturing and inventory process for the hammermill tubular rotor shaft components.

Further, the invention allows for replacement of the stub shafts, components that are smaller, less expensive and easier to replace than the known solid through-shaft.

The above specification describes certain preferred embodiments of this invention. This specification is in no way intended to limit the scope of the claims. Other modifications, alterations, or substitutions may now suggest themselves to those skilled in the art, all of which are within the spirit and scope of the present invention. It is therefore intended that the present invention be limited only by the scope of the attached claims below:

The invention claimed is:

1. A method of manufacturing hammermills with tubular rotor shaft assemblies of the same rotor diameter comprising:

mounting two flange plates on stub shafts and concentric with the axis of rotation of the stub shafts;

mounting a head disk on each flange plate, concentric with the axis of rotation of the stub shafts;

placing at least one circular spacer ring between the flange plates and concentric with the axis of rotation of the stub shafts;

keying the junction between adjacent spacer rings;

attaching at least one intermediate disk in the keyed junction between the spacer rings concentric with the axis of rotation of the stub shafts;

connecting the two flange plates with at least one tie rod and tie rod nut;

increasing the compression on the at least one tie rod; and adding spacer rings and intermediate disks to increase the length of the tubular rotor shaft.

2. The method of claim 1, further comprising removing spacer rings and intermediate disks to decrease the length of the tubular rotor shaft.

3. The method of claim 1, wherein the spacer rings and intermediate disks are interchangeable between tubular rotor shaft assemblies of equivalent diameter.

4. The method of claim 1, wherein the minimum compression load applied by the at least one tie rod is the highest unit compression force at the attachment between the spacer rings and the intermediate disks.

* * * * *